June 30, 1970  J. DUTILLOEIL ET AL  3,518,452
CIRCUIT FOR DETECTING A CURRENT AND A VOLTAGE OF
A PREDETERMINED MAGNITUDE Filed Nov. 2, 1966  3 Sheets-Sheet 1

INVENTORS
Jacques DUTILLOEIL
Joseph CLAES

ATTORNEY

INVENTORS
Jacques DUTILLOEIL
Joseph CLAES

ATTORNEY

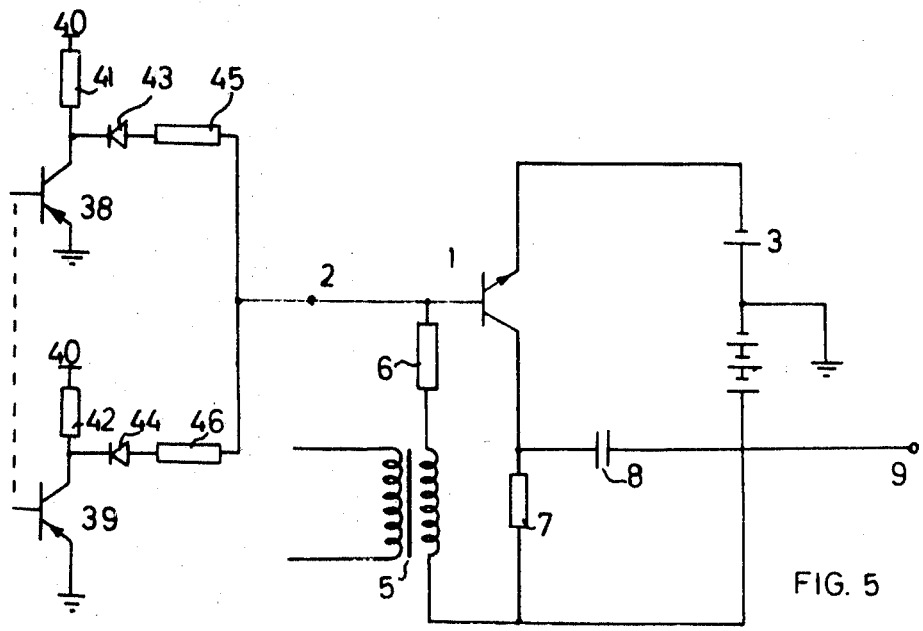
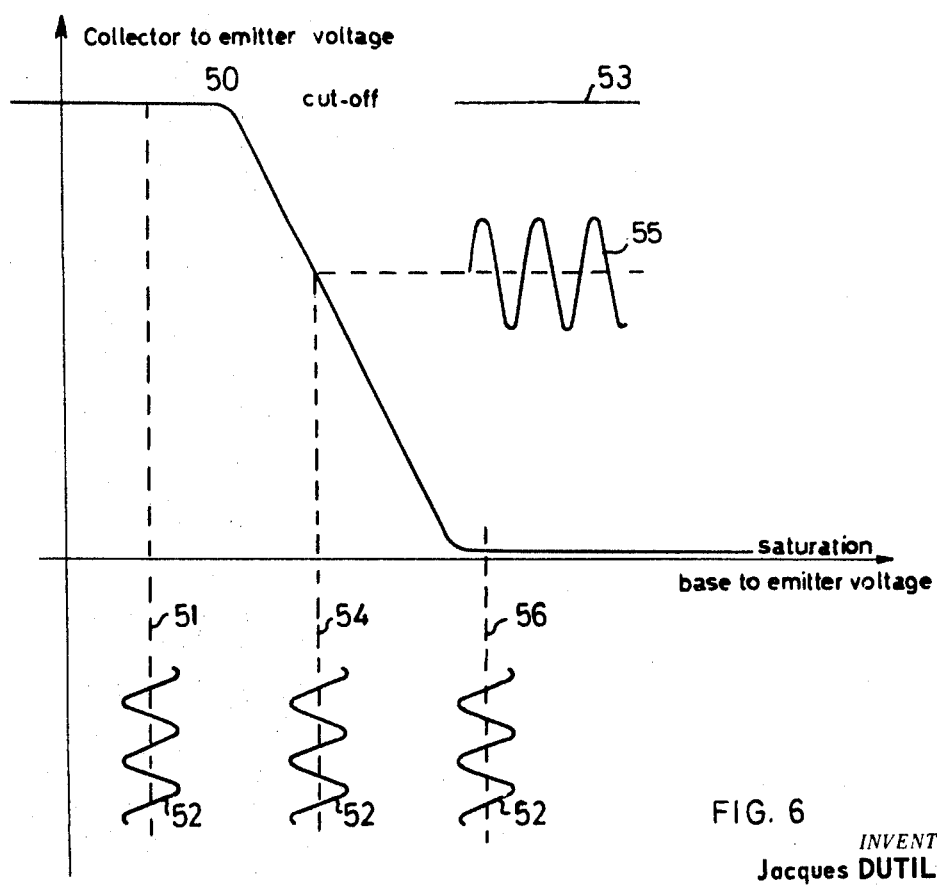
FIG. 5
FIG. 6
INVENTORS
Jacques DUTILLOEIL
Joseph CLAES
ATTORNEY

United States Patent Office 3,518,452
Patented June 30, 1970

3,518,452
CIRCUIT FOR DETECTING A CURRENT AND A VOLTAGE OF A PREDETERMINED MAGNITUDE
Jacques Dutilloeil and Joseph Claes, Mont-sur-Marchienne, Belgium, assignors to Ateliers de Constructions Electriques de Charleroi (ACEC) Societe Anonyme, Charleroi, Belgium
Filed Nov. 2, 1966, Ser. No. 591,546
Claims priority, application Belgium, Nov. 3, 1965, 671,716
Int. Cl. H03k 5/20
U.S. Cl. 307—235      3 Claims

ABSTRACT OF THE DISCLOSURE

This disclosure relates to a circuit for measuring a current or a voltage of a predetermined magnitude which comprises at least one amplification element biassed by a direct current power source which determines its range of proportional amplification between a cut-off level and a saturation level. A control circuit applies the current or voltage to be measured to the amplification element and determines its working point in the range of proportional application when the current or voltage to be measured is located between the saturation level and the cut-off level of the amplification element. When the magnitude of the current or voltage to be measured is outside the said levels the amplification element is either cut-off or saturated. An alternating current signal having an amplitude less than the difference between the saturation level and the cut-off level of the amplification element is applied to the amplification element and an output detecting circuit is provided for detecting the alternating current output when the current or voltage to be measured is of said predetermined magnitude.

---

The present invention relates to a circuit emitting an output signal when the magnitude of an electrical current or voltage to be measured is comprised between two predetermined limits. The detection of the current or voltage thus determined is done in safety. In other words, the output signal of this detecting circuit is emitted only if the predetermined condition is fulfilled, in all other cases as well as in the case of failure in the detecting circuit, the output signal is nil.

The circuit for the detection of a current or a voltage of predetermined magnitude according to the invention comprises at least one amplification element connected to a power source and biassed by means of a voltage branched off the current or the voltage to be measured; it is characterized by the fact that this bias voltage establishes the working point of the amplification element or elements in the range of proportional amplification when the current or the voltage to be measured is located between the two predetermined limits whereas for magnitudes of the current or of the voltage outside the said limits, the amplification element is either cut-off or saturated, by the fact that an oscillation is generated in the control circuit of the amplification element or elements and by the fact that the output signal of the circuit is constituted by the said oscillation and amplified in the amplification element or elements, the gain of the amplification elements being selected in relation to the sensitivity threshold of an output amplifier connected thereto, so that in the case of a short circuit between the control circuit and the output where the amplified oscillation should appear, the level of the output signal be weaker than the said sensitivity threshold of the output amplifier.

The invention is hereinafter explained in relation to a few embodiments, the electrical diagrams of which are illustrated in the appended drawing in which:

FIG. 5 is an electrical diagram of an exclusion logic circuit using the circuit of FIG. 1; and FIG. 6 is a diagram illustrating the operation of the amplifier circuit used in the invention.

Figure 1:
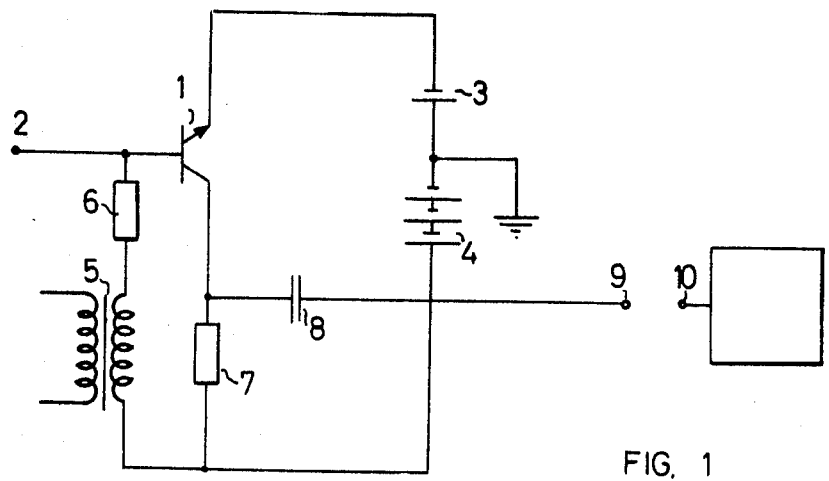
FIG. 1 is an electrical diagram of a voltage discriminator in accordance with the invention.

FIG. 1 is an electrical diagram of a voltage discriminator according to the invention. This discriminator comprises a transistor 1 biassed by means of a voltage applied across an input terminal 2 connected to the base of the transistor 1. The voltage applied across terminal 2 is taken in relation to ground. Transistor 1 is energized by two sources 3 and 4 connected to ground. The potential of source 3 determines the limit of the magnitude of the voltage applied across terminal 2 for which the transistor is cut-off. In certain cases, this potential may be a variable potential. The other limit of the voltage applied across terminal 2 is determined by the internal characteristics of transistor 1. It is the value of the voltage for which the transistor 1 is saturated.

To detect the position of the working point of transistor 1, an oscillation is generated in the control circuit of transistor 1. In the present case, this oscillation is induced in the secondary winding of an input transformer 5, mounted in the circuit connecting the base of the transistor 1 through a resistance 6 and the bias sources 4 and 3 to the emitter of transistor 1.

The output signal is constituted by the oscillation amplified in the transistor 1. It appears at the collector of transistor 1, connected to the positive terminal of source 4 through a resistance 7. The output signal is nil when the transistor 1 is cut-off or when it is saturated. It is brought to an output terminal 9 for instance through a condenser 8. Terminal 9 may be connected to the input 10 of an output amplifier or to an output rectifier-amplifier when it is desired to have a D.C. current or voltage. The gain of transistor 1 is selected in relation to the sensitivity threshold of the output amplifier so that in the case of a short circuit between the base and the collector of transistor 1, the level of the signal at the terminal 9 be weaker than the sensitivity threshold of the output amplifier connected thereto through terminal 10.

Any fault in this circuit, for instance a break in one of the conductors or a short circuit in transistor 1, results in the disappearance of the oscillation at terminal 9. This is therefore a safety circuit in the sense defined above.

Figure 2:
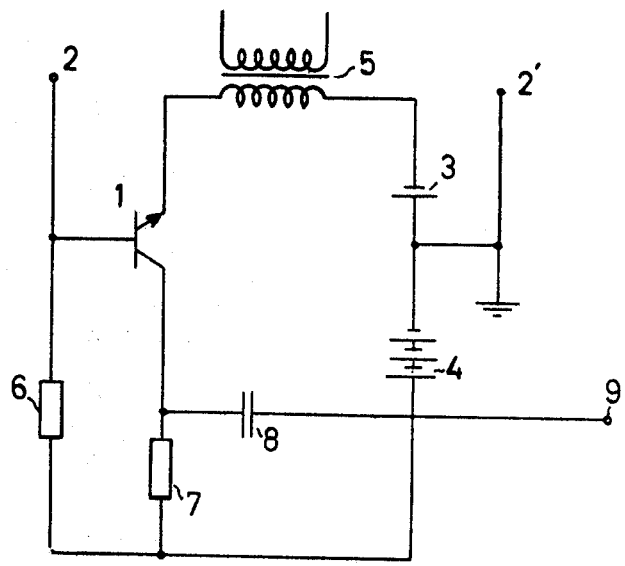
FIG. 2 is an electrical diagram of an alternative embodiment of the invention to be used where the discriminator is intended for the detection of a D.C. current.

The circuit according to FIG. 2 is an alternative to that of FIG. 1, to be used where the discriminator is intended for the detection of a D.C. current the magnitude of which is located between two limits. The current generator is connected to the input terminals 2 and 2'.

Figure 3:
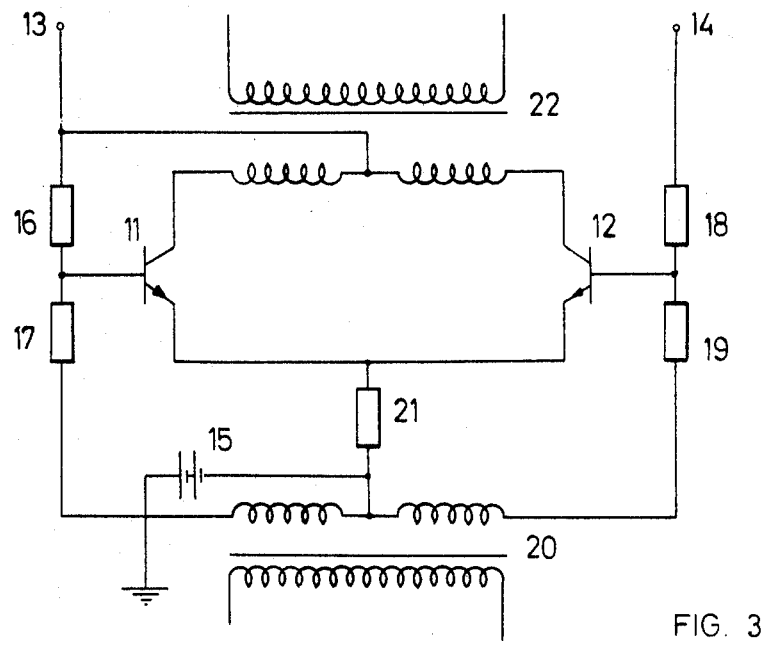
FIG. 3 is an electrical diagram of a voltage comparator in accordance with the invention.

FIG. 3 is an electrical diagram of a voltage comparator. This comparator comprises two transistors 11 and 12 each biassed by a voltage branched off one of the voltages to be compared. One of the voltages to be compared, for instance the reference voltage, is applied across an input terminal 13 and the other, for instance the measured voltage, is applied across an input terminal 14. The input terminal 13 is connected to the negative terminal of a voltage power source 15 through a voltage divider constituted by two resistances 16 and 17 determining the base potential of transistor 11. The input terminal 14 is connected to the negative terminal of the voltage source 15 through a voltage divider constituted by two resistances 18 and 19 determining the base potential of transistor 12. Preferably, for reasons of symmetry, resistances 16 and 18 on the one hand and 17 and 19 on the other hand are respectively equal.

The collectors of transistors 11 and 12 are biassed by the potential of the voltage to be compared applied across terminals 13 and 14.

The mean operating point of the circuit is determined by the mean potential of the voltages applied across terminals 13 and 14 and by the potential of the source 15. It obviously moves according to the mean value between the voltages applied across terminals 13 and 14. However, it remains in the range of proportional amplification in a very wide range of variation in the voltages applied across terminals 13 and 14, provided that the said voltages be practically equal between them. Even for a small variation between the two voltages, the transistor biassed by the smallest voltage is cut-off. Two very close limit values are thus defined that may even vary according to the variations in the reference voltage. That is why this comparator may be used for A.C. voltages provided the frequency of the alternating voltage be sufficiently small.

In order to detect the various conditions of the circuit, an oscillation haivng a freqeuncy much greater than that of the voltages applied across terminals 13 and 14 is generated in the circuit connecting the emitters to the bases of the transistors. This oscillation is induced in two secondary windings of an input transformer 20 connected between the resistances 17 and 19. The middle point between these two windings is connected on the one hand to the power source 15 and on the other hand, through a common resistance 21, to the emitters of transistors 11 and 12. The oscillation introduced by the input transformer 20 is amplified by the transistors 11 and 12 when the latter are not cut-off. In this case, these two transistors work in push-pull and feed an output circuit connected to the collectors. The output circuit is constituted by two primary windings of an output transformer 22. The median point of the said windings is connected to the terminal 13 thus allowing the collectors to be energized as a function of the value of the voltages to be compared. When one of the transistors 11 and 12 is cut-off, the oscillation amplified by the other transistor must necessarily travel across the common resistance 21 where it is damped so that the output signal feeding the output transformer falls to an extremely small value, below the sensitivity threshold of the output amplifier connected to the secondary of transformer 22. On the other hand, when the working point of each of the transistors 11 and 12 is located in the range of proportional amplification, the amplified oscillation does not flow through the resistance 21.

The output signal of the transformer 22 answers the requirements as to safety. It is nil when any fault affects the circuit: break in a conductor, unbalance of the resistances 18, 19, 16, 17 or short-circuit in one of the transistors.

Figure 4:
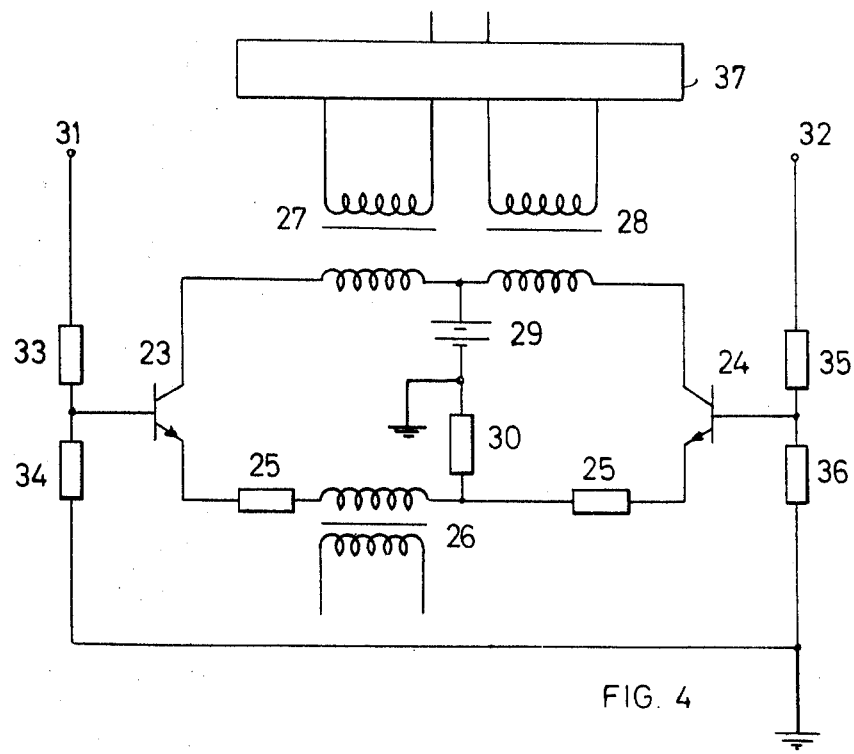
FIG. 4 is an electrical diagram of a voltage comparator similar to FIG. 3.

FIG. 4 is a circuit diagram similar to that of FIG. 3. Two transistors 23 and 24 capable of working in push-pull are interconnected by their emitters through two small resistances 25 and the secondary winding of an input transformer 26. The collectors of the two transistors 23 and 24 are interconnected through the primary windings of two output transformers 27 and 28. The median point between the primary windings of the said two transformers 27 and 28 is connected to a voltage power source 29. The bases of the two transistors 23 and 24 are biassed by two voltages to be compared applied across two terminals 31 and 32 through a voltage divider constituted by the resistances 33 and 34 connected to terminal 31 and a voltage divider constituted by resistances 35 and 36 connected to terminal 32. The resistances 34 and 36 are interconnected and grounded.

When the two voltages applied across terminals 31 and 32 are equal, the two transistors amplify the oscillation introduced by the transformer 26. If for a predetermined variation between these two voltages, one of the transistors is cut-off, only one of the two transformers 27 or 28 emits the amplified oscillation so that a safety AND circuit 37 connected to the transformers 27 and 28 does not emit any signal. This is a safety circuit. Even if the common resistance 30 is short-circuited, the signal at the output of device 37 becomes nil. This was not the case for the circuit according to FIG. 3.

An original and advantageous application is described in relation to FIG. 5. This figure is an electrical diagram of an exclusion logic circuit using the circuit according to FIG. 1. It makes it possible to control a logic circuit wherein, amongst a certain number of variables, one and only one may have the value 1, whereas all the others take on the value 0. The values 0 and 1 of the different logic variables are represented by the conducting or non-conducting state of an arbitrary number of transistors 38, 39 the emitter of each of which is connected to ground whereas the collector is connected to a negative voltage source 40 through resistances 41 and 42. The collectors of all the transistors 38, 39 are connected to the terminal 2 of the circuit according to FIG. 1 each through a diode 43, 44 and a resistance 45, 46. Preferably, for reasons of symmetry, the values of resistances 41, 42 are equal between themselves and the values of the resistances 45 and 46 are also equal between themselves. If all the transistors 38, 39 are conducting, the voltage at terminal 2 reaches ground potential for which transistor 1 is saturated. If only one of the transistors 38, 39 is not conducting, the voltage at terminal 2 becomes smaller than the ground potential so that the diodes 43, 44 of the other transistors are cut-off. The emitter voltage established by source 3 is selected to be slightly more negative than that appearing in this case at terminal 2 whereby the working point of transistor 1 is located in the range of proportional amplification. If at least two transistors 38, 39 are not conducting, the voltage across terminal 2 decreases by a factor of at least 2 in relation to that which is set if only one of the transistors 38, 39 is not conducting. In this case, the transistor 1 is cut-off. The circuit according to FIG. 5 thus makes it possible to safely control if there is indeed one and only one of the variables that takes the value 1 in all of the logic variables determined by the conducting or non-conducting state of transistors 38, 39.

In FIG. 6 is shown a diagram illustrating the operation of the amplifying element. There is shown a response curve 50 illustrating in ordinate the collector output voltage of a transistor witth respect to its emitter in function of its base to emitter voltage given in abscissa. When the D.C. bias voltage of the control circuit applied to the base has a value 51 or lower, an alternating voltage 52 superimposed on the D.C. voltage gives an output signal 53 having no A.C. component because the transistor is cut-off. On the contrary, when the D.C. bias voltage of the control circuit has a value 54, the alternating voltage 52 superimposed on the D.C. bias voltage gives an amplified alternating output voltage 55. If the D.C. bias voltage of the control circuit takes the value 56 or higher, the transistor is saturated and no alternating voltage output is provided.

An input transformer or any other device must be provided permitting to apply an alternating voltage signal having an amplitude less than the difference between the saturation level and the cut-off level of the transistor. In such a case, the alternating voltage output 55 will appear only when the biasing voltage of the control circuit takes a value which locates the working point of the transistor in its range of proportional amplification, for example point 54. In case of a short-circuit between emitter and collector, the transistor acts as if it was saturated and the output detecting circuit does not detect any signal. In case of a current interruption, for example an open connection, the output detection circuit does not detect any signal either. The above circuit is consequently a safety circuit because it never provides an output in case of a failure.

The circuits according to the invention can be used in control circuits, namely in safety control circuits. They make it possible to verify if a measured magnitude is located between two predetermined limits, the said limits may be fixed or one of the two may vary as a function of the reference voltage.

We claim:

1. A circuit for measuring a current or a voltage of a predetermined magnitude, comprising:
   (a) a direct current power source;
   (b) an amplifier including a transistor connected to said direct current power source, said transistor being blocked for certain bias voltages and being saturated for certain other bias voltages and having a proportional working range for bias voltages between said first and second mentioned bias voltages;
   (c) a control circuit applying a direct current bias voltage to the base of said transistor fixing its working point in the range of proportional amplification when the current or voltage to be measured is located between two predetermined limits, whereas for magnitude of the current or the voltage outside the said limits the transistor is either cut-off or saturated, said control circuit including a plurality of resistors in parallel and wherein bottoming of the direct current power source via one unique resistor in the control circuit will fix the working point of the transistor in the proportional range whilst bottoming of the direct current power source via more than one resistor in the control circuit or negatively polarizing the base will either saturate or cut-off the transistor;
   (d) an alternating current signal input means connected between the base and collector of said transistor for amplification of said signal, said alternating current signal input means having an amplitude less than the difference between the saturation level and the cut-off level of the transistor; and
   (e) alternating current output detecting means for detecting the alternating current output of the transistor when the current or voltage to be measured is of said predetermined magnitude.

2. A circuit for measuring a current or a voltage of a predetermined magnitude comprising:
   (a) a direct current power source;
   (b) an amplifier including two amplification elements mounted in push-pull and having control and output electrodes and a resistance common to both said amplification elements, said amplifier being blocked for certain bias voltages and being saturated for certain other bias voltages and having a proportional working range for bias voltages between said first and second mentioned bias voltages;
   (c) a control circuit applying direct current bias voltages to the control electrodes of the amplification elements, one of the control electrodes being at a reference potential and the other control electrode being at the potential of the voltage to be measured, the value of the common resistance and the voltage of the direct current power source being so chosen that the working point of the push-pull amplifier is in the proportional range if the voltage to be measured is within predetermined limits with respect to the reference potential and, if the voltage to be measured is outside these limits, either one or the other of the amplification elements is cut-off;
   (d) an alternating current signal input means consisting of transformer windings connected between said common resistance and the control electrodes of said amplification elements, said alternating current signal input means having an amplitude less than the difference between the saturation level and the cut-off level of the amplification elements; and
   (e) alternating current output detecting means consisting of transformer windings connected between the output electrodes of the amplification elements for detecting the alternating current output of the amplification elements when the current or voltage to be measured is of said predetermined magnitude.

3. A circuit for measuring a current or a voltage of a predetermined magnitude, comprising:
   (a) a direct current power source;
   (b) an amplifier including two transistors having control and output electrodes mounted in push-pull and a resistance common to both said transistors, said amplifier being blocked for certain bias voltages and being saturated for certain other bias voltages and having a proportional working range for bias voltages between said first and second mentioned bias voltages;
   (c) a control circuit applying direct current bias voltages to the control electrodes of the transistors, one of the control electrodes being at a reference potential, the other control electrode being at the potential of the voltage to be measured, the value of the common resistance and the voltage of the direct current power source being so chosen that the working point of the push-pull amplifier is in the proportional range if the voltage to be measured is within predetermined limits with respect to the reference potential and, if the voltage to be measured is outside these limits either one or the other of the transistors is cut-off;
   (d) an alternating current signal input means consisting of transformer windings connected between the emitters of the transistors, said alternating current signal input means having an amplitude less than the difference between the saturation level and the cut-off level of the transistors; and
   (e) alternating current output detecting means consisting of a transformer including a primary winding connected between the output electrodes of the transistors and a secondary winding connected to a logical AND safety-circuit, said detecting means detecting the alternating current output of the transistors when the current or voltage to be measured is of said predetermined magnitude.

References Cited

UNITED STATES PATENTS

| | | | |
|---|---|---|---|
| 2,982,867 | 5/1961 | Wennerberg | 307—257 X |
| 3,054,910 | 9/1962 | Bothwell | 307—235 |

OTHER REFERENCES

Pulse, Digital and Switching Waveforms, by Millman and Taub, McGraw-Hill Book Company, New York, 1965, p. 2.

DONALD FORRER, Primary Examiner

B. P. DAVIS, Assistant Examiner

U.S. Cl. X.R.

307—237, 264